United States Patent [19]

Geerlings

[11] Patent Number: 6,073,112

[45] Date of Patent: *Jun. 6, 2000

[54] COMPUTER SYSTEM FOR MERCHANT COMMUNICATION TO CUSTOMERS

[76] Inventor: Huib Geerlings, 129 Charles St., Boston, Mass. 02114

[*] Notice: This patent is subject to a terminal disclaimer.

[21] Appl. No.: 09/351,431

[22] Filed: Jul. 12, 1999

Related U.S. Application Data

[63] Continuation of application No. 08/684,174, Jul. 19, 1996.

[51] Int. Cl.[7] .................................................. G06F 17/60

[52] U.S. Cl. ............................................. 705/14; 705/10

[58] Field of Search .................................. 705/7, 10, 14, 705/26, 27; 709/217, 218, 219, 238

[56] References Cited

U.S. PATENT DOCUMENTS

| | | | |
|---|---|---|---|
| 4,723,212 | 2/1988 | Mindrum et al. | 705/14 |
| 4,908,761 | 3/1990 | Tai | 705/14 |
| 5,056,019 | 10/1991 | Schultz et al. | 705/14 |
| 5,227,874 | 7/1993 | Von Kohorn | 705/10 |
| 5,305,196 | 4/1994 | Deaton et al. | 705/10 |
| 5,401,946 | 3/1995 | Weinblatt | 235/381 |
| 5,446,919 | 8/1995 | Wilkins | 455/6.2 |
| 5,459,306 | 10/1995 | Stein et al. | 235/393 |
| 5,478,989 | 12/1995 | Shepley | 235/375 |
| 5,548,753 | 8/1996 | Linstead et al. | 707/1 |
| 5,592,560 | 1/1997 | Deaton et al. | 382/100 |
| 5,675,662 | 10/1997 | Deaton et al. | 382/137 |
| 5,687,322 | 11/1997 | Deaton et al. | 705/14 |

FOREIGN PATENT DOCUMENTS

| | | |
|---|---|---|
| 0 354 260 A1 | 2/1990 | European Pat. Off. . |
| 0408348A2 | 1/1991 | European Pat. Off. . |
| 0 512 509 A2 | 11/1992 | European Pat. Off. . |
| WO94/15417 | 7/1994 | WIPO . |

OTHER PUBLICATIONS

Granered, E., "Theoretical Foundations of International Internet Marketing," p. 1–6; http://www.clark.ne...ranered/theory.html (Apr. 1, 1996, downloaded).

Heath, R.P., "Psychographics: Quest–Ce Que C'est?" Marketing Tools, pp. 1–7; http://www.enews.co...rrent/110195.2html (Nov./Dec. 1995).

Hoffman, D.L. et al., "Commercial Scenarios for the Web: Opportunities and Challenger," http://www2000.0gsm...cial.scenarios.html, (Oct. 26, 1995).

"Business Builders, Marketing Planning, How to . . . Identify a Target Market and Prepare a Customer Profile," http:/edgeonline.c...nning/targetma.html, (Apr. 1, 1996, downloaded).

(List continued on next page.)

*Primary Examiner*—Eric W. Stamber
*Assistant Examiner*—Hani M. Kazimi
*Attorney, Agent, or Firm*—Hamilton, Brook, Smith & Reynolds, P.C.

[57] ABSTRACT

A computer system provides automated merchant-to-customer communication. Each merchant customer is grouped into an initial grouping or entry segment, based on merchant definition of allocation filters. Merchant-defined triggers subsequently resegment customer groupings based on predefined criteria which includes any measurable behavioral patterns as provided by the merchant and stored in a data base. Resegmenting is continually or dynamically provided based on behavior (e.g., shopping activity) of customers. Predefined communication scheduling and/or merchant-defined events initiate execution of a working communication designed by the merchant. The triggers and events are merchant-specified sets of criteria based on demographics, psychographics, and customer shopping behavior. Further filtering of a group of target customers to a final recipient group based on merchant specified criteria is provided by program filters. The present invention combination of allocators, triggers, filters, events and communication programs enable merchant communication of a desired message, to an appropriate recipient group, at a desired time, to be automated through computer systems.

6 Claims, 12 Drawing Sheets

OTHER PUBLICATIONS

Information describing Broad/Vision One–to–One Application System: "Overview," pp. 1; "Further Resources on One–to–One Marketing," pp. 1; "BroadVision Unleases the Power of the Internet with Personalized Marketing and Selling," pp. 1–3; "Frequently Asked Questions," pp. 1–2; "Products," p. 1; "BroadVision One–to–One", pp. 1–2; "Dynamic Command Center," p. 1; "Architecture that Scales," pp. 1–2; "Creating a New Medium for Marketing and Selling BroadVision One–to–One and the World Wide Web a White Paper," pp. 1–15; http://www.broadvision.com (Jan.–Mar. 1996).

Jones, Donald H. "Industry Net: A Model for Commerce on the World Wide Web," *IEEE Expert,* vol. 10, No. 5, pp. 54–59 (Oct. 1995).

Sun, Lena H., "Checking Out the Customer," *The Washington Post* (Jul. 9, 1989).

MAIN SYSTEM OVERVIEW

Part 1 of 2

Part 2 of 2

COMPUTER SYSTEM FOR MERCHANT COMMUNICATION TO CUSTOMERS

RELATED APPLICATIONS

This application is a continuation of U.S. patent application Ser. No. 08/684,174 filed Jul. 19, 1996, the entire teachings of which are incorporated herein by reference.

BACKGROUND OF THE INVENTION

For years, merchants have sought ways to better direct their products and/or services to ultimate consumers. In advertising their products, the predicted or targeted consumer may or may not be the ultimate consumer. Further, once a purchase has been made, the merchant desires to provide follow-up products/services to create a strong customer relationship. To be successful, merchants have looked to the marketing and advertising industry for various means and methods to better communicate with their customers.

One traditional technique utilized in the marketing and advertising industry is regression analysis. Briefly, regression analysis is a statistical method for estimating cost relations. The analysis fits a regression line to data/observation points by a least squares method. Qualitatively speaking, regression analysis provides a profile of a merchant's existing customers or prospective new customers based on trackable criteria such as zip code, gender and the like.

Another example indicator utilized in the direct marketing industry is a regency frequency monetary value (RFMs). These indicators quantify how recently (regency) a purchase was made (1 month ago, 2 months ago, etc.) and how often (frequency) purchases were made in a given month. Based on these two criteria, a dollar value (called RFM value) is assigned to each pair of regency and frequency data. The RFM values are then used to make certain inferences about the consumer-purchasers.

Although various surveys, modeling analyses and indicators are available, they typically only look to profiles or groupings of types of people to predict behavior of a customer group. That is, most of the currently available analyses create simulated behavior profiles from which behavior of customers are inferred. These inferences are only fairly accurate as people often have individual (unique) desires which affect their shopping behavior. These individual desires are generally not accounted for in the prior art.

SUMMARY OF THE INVENTION

The present invention provides a merchant-to-customer communication system which improves over the prior art. In particular, the communication system of the present invention accounts for individual shopping behavior of the consumer and tailors the communication accordingly (with respect to content and timing (i.e., when to contact the consumer).

In a preferred embodiment, the present invention communication system is a computer apparatus comprising a source of recipient information (including shopping activity) and a digital processor assembly coupled to the source. In response to receiving recipient information from the source, the digital processor assembly forms subsets of recipients as a function of demographics, shopping activity and/or said desired communications. For each subset, the digital processor assembly provides a working communication by determining (a) date of the working communication and (b) content of the working communication. Timing for initiating communications, and hence the date of working communication, is determined from merchant specified indications in the source of information. Preferably, indications of timing of communications are in terms of certain shopping activities. Upon such shopping activity being recorded in the source with respect to one or more customers, the digital processor assembly initiates a respective working communication.

In accordance with one aspect of the present invention, the digital processor assembly monitors the source for shopping activity of recipients. In turn, the digital processor assembly continually forms and reforms the subsets of recipients based on recorded shopping behavior of a recipient. This is referred to as dynamic behavioral segmentation. That is, based on customer behavior, the digital processor assembly automates movement (adjustment) of customers from segment to segment.

In accordance with another aspect of the present invention, the source is formed of a first and a second database. The first database stores identification and demographics of recipients, as well as shopping activity (e.g., transactions) of recipients. The second database stores indications of desired communications including indications of times for initiating communications and indications of contents of communications.

The shopping activity recorded in the present invention apparatus includes cumulative purchase behavior of a consumer, historic behavior or expected future behavior, or any combination thereof. In particular, initiation of a desired communication may be based on a specific purchase made by a recipient, or the passage of a certain length of time from a specific shopping activity by the recipient, or the last inquiry made by the recipient and seasonal activity by recipients, for example.

In accordance with another aspect of the present invention, output means are coupled to the digital processor assembly for receiving the working communications. Upon receipt, the output means transmits contents of the communications to respective recipients. The output means includes one or a combination of a mail house, E-mail, a telemarketing company, electronic communication lines (e.g., a Website on the Internet) and facsimile. In turn, the contents of the working communications include scripts, brochures, standard letters, forms, electronic data attachments, return envelopes of a merchant and the like, singularly or in any combination. Further, attachments and other word processor type documents may be compiled for print on demand or otherwise completed at the printing end of the process. In that case, recipient information is transmitted to the output means (from the digital processor assembly) for insertion into the attachments by the output means. In the case of print on demand, the output means compiles communication contents to form a print file. The print file is then downloaded or otherwise transmitted upon receipt of a print request.

BRIEF DESCRIPTION OF THE DRAWINGS

The foregoing and other objects, features and advantages of the invention will be apparent from the following more particular description of preferred embodiments and the drawings in which like reference characters refer to the same parts throughout the different views. The drawings are not necessarily to scale, emphasis instead being placed upon illustrating the principles of the invention.

DETAILED DESCRIPTION OF THE INVENTION

The present invention provides a computer system for enhancing and improving communications from a merchant to his customers. In particular, the present invention communication system automates preparation and transmission of written and/or verbal communications based on behavior (e.g., shopping activity) of customers. As used herein "shopping activity" or "shopping history" includes (1) actions invoked by the customer, such as complaints, purchases or other transactions, (2) actions invoked by the merchant, such as contacting customers by phone or mail, etc., (3) data collections of the merchant with respect to customers, such as name changes, marital status change data, etc., and 4) time driven actions such as passage of time from a specific purchase, or age of customer, etc.

Key to the present invention is its dynamic behavioral segmentation which utilizes different kinds of merchant defined elements such as purchase frequency, purchase volume, complaint behavior, product category interest, seasonal purchase behavior, contact preferences (e.g., phone, mail, E-mail) and any other measurable behavioral patterns of customers to segment/group like customers. The purpose of such segmentation is to group like people (customers) in segments (subsets) which are defined to respond well to a specific marketing or relationship campaign (i.e., merchant communications) designed to achieve certain marketing goals. The dynamic or continual resegmentation of customers based on changes in shopping activity/behavior ensures that pertinent and timely communications are made (automated) by the present invention system. These and other advantages of the present invention will become apparent in the following description of the preferred embodiment.

Figure 1:
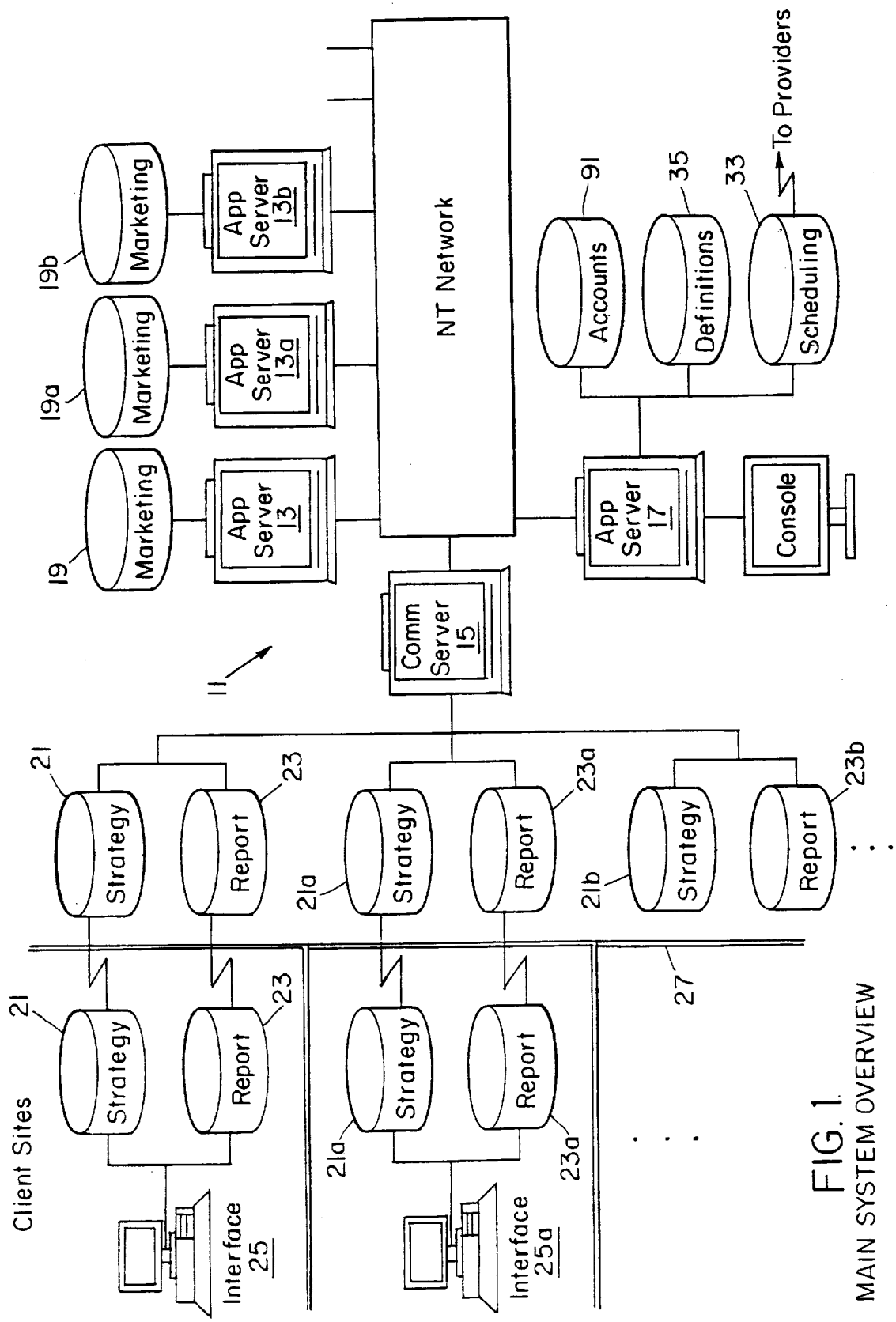
FIG. 1 is a schematic overview of a computer network system embodying the present invention.

By way of overview, the invention software resides on a central digital processing assembly 11 which may be a main frame, mini computer or network of PC's 13, 15, 17 as illustrated in FIG. 1. Conceptually, included are a communications server 15, main server 17, and for each merchant (a) an application server 13, (b) a marketing database 19, (c) a strategy database 21 and (d) a report database 23 as will be discussed in detail below. Briefly, the marketing database 19 stores customer information of a merchant, and the strategy database 21 stores, among other details, plans or outlines of desired communications from the merchant to his customers. The communications server 15 synchronizes and consolidates tasks transmitted from among the merchant computer systems 25 and strategy databases 21. The main server 17 schedules and dispatches work within the central processing assembly 11. The applications servers 13 maintain the respective marketing databases 19 and generate/execute the desired communications as outlined in the strategy database 21.

The computer systems of various merchants are coupled to the central digital processing assembly 11 across communications lines 27. Preferably, the communications lines 27 are dedicated lines (e.g., LAN, standard dialout phone line, dedicated lease line) with a frame relay (or point to point) connection. The merchant computer systems 25 are, for example, a mainframe or PC's of the XX486 processing ability (e.g., Pentium CPU) having one gigabyte drive, 16 megabytes of RAM (random access memory), with typical I/O accessories including a keyboard, mouse and printer, or similar workstation. Each of the merchant computer systems 25 and the central digital processing assembly 11 (specifically the communications server 15) also have a modem (e.g., CSDSU, TI Communication, or cable modems) for coupling to the communication line 17 and enabling communications between the central digital processing assembly 11 and the merchant computer systems 25.

As illustrated in FIG. 1, multiple merchants/merchant computer systems 25 may employ the present invention communications system/software. However, for ease of understanding and clarity, the following discussion will refer to one merchant computer system 25, the details of which are understood to apply to each merchant computer system 25 coupled to the central digital processing assembly 11 across communication lines 27.

To initialize the communication system of the present invention with respect to a particular merchant, the merchant provides certain information regarding his customers, including shopping activity, name, address, E-mail address, phone number, facsimile number, age, etc. This information is stored in a marketing database 19 at the central digitial processing assembly 11 side of the communication system. For each merchant, there is a respective marketing data base 19. The shopping activity portion of information includes indications of purchase history or purchases made (indicated by dates and items, for example) by the customer, other visits or communications (complaints or suggestions) from the customer (indicated by date and store site), and the like.

The merchant constantly updates the shopping activity information, as well as other customer data as it becomes known to the merchant. That is, customer data from the merchant's billing, invoicing and other systems is electronically transmitted from, or downloaded to, diskettes or magnetic tape at the merchant's computer system 25. Upon receipt at the central digital processing assembly 11, a working routine of the application server 13 corresponding to the merchant updates the respective marketing database 19 accordingly. A definitions database 35 holds file formats and layouts of the transmitted/downloaded data. The working routine uses this format/layout information to translate the downloaded data into the marketing database 19.

Once the customer information is entered and stored in the marketing database 19, indications of the merchant's desired communications are stored in a respective strategy database 21. There is a different strategy database for different merchants, such that there is one strategy database 21 for each merchant. The strategy database 21 is illustrated in FIG. 1 as residing at the merchant computer system 25 and being downloaded to the central digital processing assembly 11 across communication lines 27. It is understood that, alternatively, the strategy database 21 may reside at the central digital processing assembly 11 but have on-line (or similar) accessibility via communication lines 27 from the merchant computer system 25.

At any rate, the strategy database 21 holds a set of plan outlines/working programs 53 (FIG. 4a) formulated by the merchant for various desired customer communications. A plan outline/working program 53 is defined as a singular communication with one or more customers or prospective customers. Working programs 53 may be combined into campaigns consisting of merchant-defined consecutive communications. Each plan outline/working program 53 identifies (1) the type of customer to whom the communication is to be sent (i.e., the target customer profile), (2) the contents of the communication, (3) the date(s) or timing of when the communication is to be sent, (4) the desired communication channel (i.e., mail, E-mail, facsimile, Internet, etc.) to be used, and (5) a destination (i.e., mail house, telemarketer, the merchant company or customer himself).

In point (1) above, any combination of criteria based on age, gender, geographical location, shopping activity, etc., as stored in the marketing data base 19, may be used to specify the target customer (and hence desired customer subset or segment). In the preferred embodiment, a Boolean-type expression called a "trigger unit" 51 (FIG. 4d) is used to delimit each criteria. Each trigger unit 51 is joined together to form a working statement or "trigger" 49 using conjunctions AND, OR, NOT, as discussed below in FIG. 4d. For example, the trigger/working statement "(purchase frequency=1) AND (today–date last purchase>60 days)" specifies customers who have made only a single purchase more than two months ago, as the target customer group for the respective communication. Alternatively, the target customer may be defined in terms of certain shopping activity or an event 37 performed by a customer (e.g., his 10th purchase from the merchant) as discussed below in FIGS. 4a and 6.

The contents of the communication may include a specific letter, a form letter, preprinted brochure, catalogues, attachments, enclosures (e.g., return envelope), E-mail files or other electronic data/documents, Web pages, etch, singularly or in any combination. In the preferred embodiment, the plan outline/working program 53 specifies communication content by a code indication, pointer or other indicia as illustrated in FIG. 3 and described below.

The desired date(s) or timing schedule for transmitting the communication may be a one-time occurrence (e.g., specific date), or on a periodic recurring basis (e.g., daily, weekly, etc.), or in real-time in the case of Internet communications. The merchant may specify the timing in terms of occurrence of one or more events. For example, the purchase of a certain appliance, or passage of a certain amount of time after purchase date of a specific item, to name a few.

As will be detailed later, once plan outlines/working programs 53 are defined, the central digital processing assembly 11 automatically executes them. Briefly, working programs 53 are executed by scheduling output of the respective communication contents either at a specific date or on a recurring basis; and programs 53 are executed against a group of subjects who are either extracted from selected customer groupings (i.e., segments or subsets) based on triggers 49 or are separated based on certain predefined events 37. As such, a merchant may set up a working program 53 that weekly collects customers who purchased a certain appliance and sends them an extended warranty offer, or sends thank you notes to frequent/large quantity purchasers, for example; or a merchant bank could define a program 53 that would send everyone with a certain checking account deposit volume and no savings accounts, a special offer on a money market account, for example.

Figure 2:
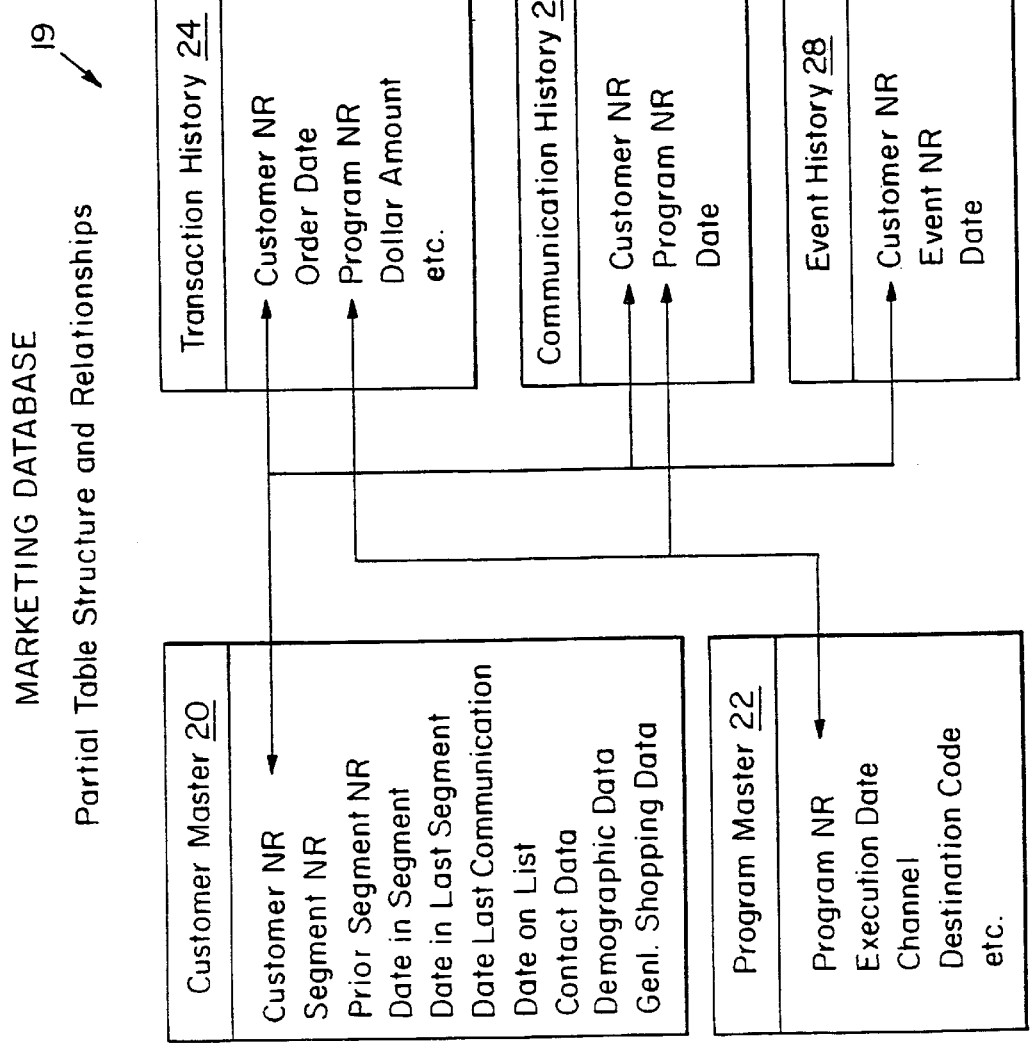
FIG. 2 is a block diagram of the marketing database employed in the system of FIG. 1.
Figure 3A:
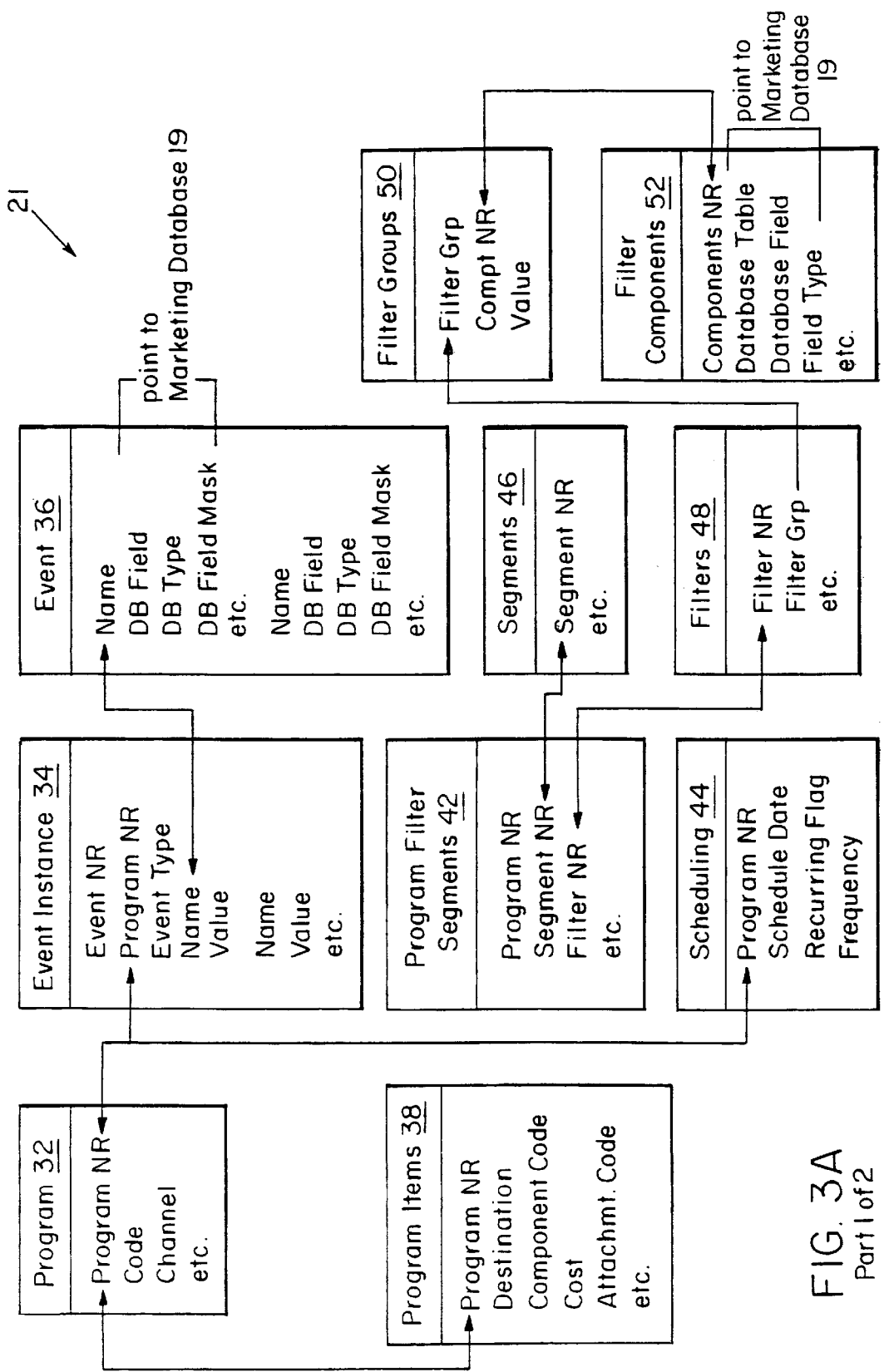
FIGS. 3a and 3b are block diagrams of a strategy database employed in the system of FIG. 1.
Figure 3B:
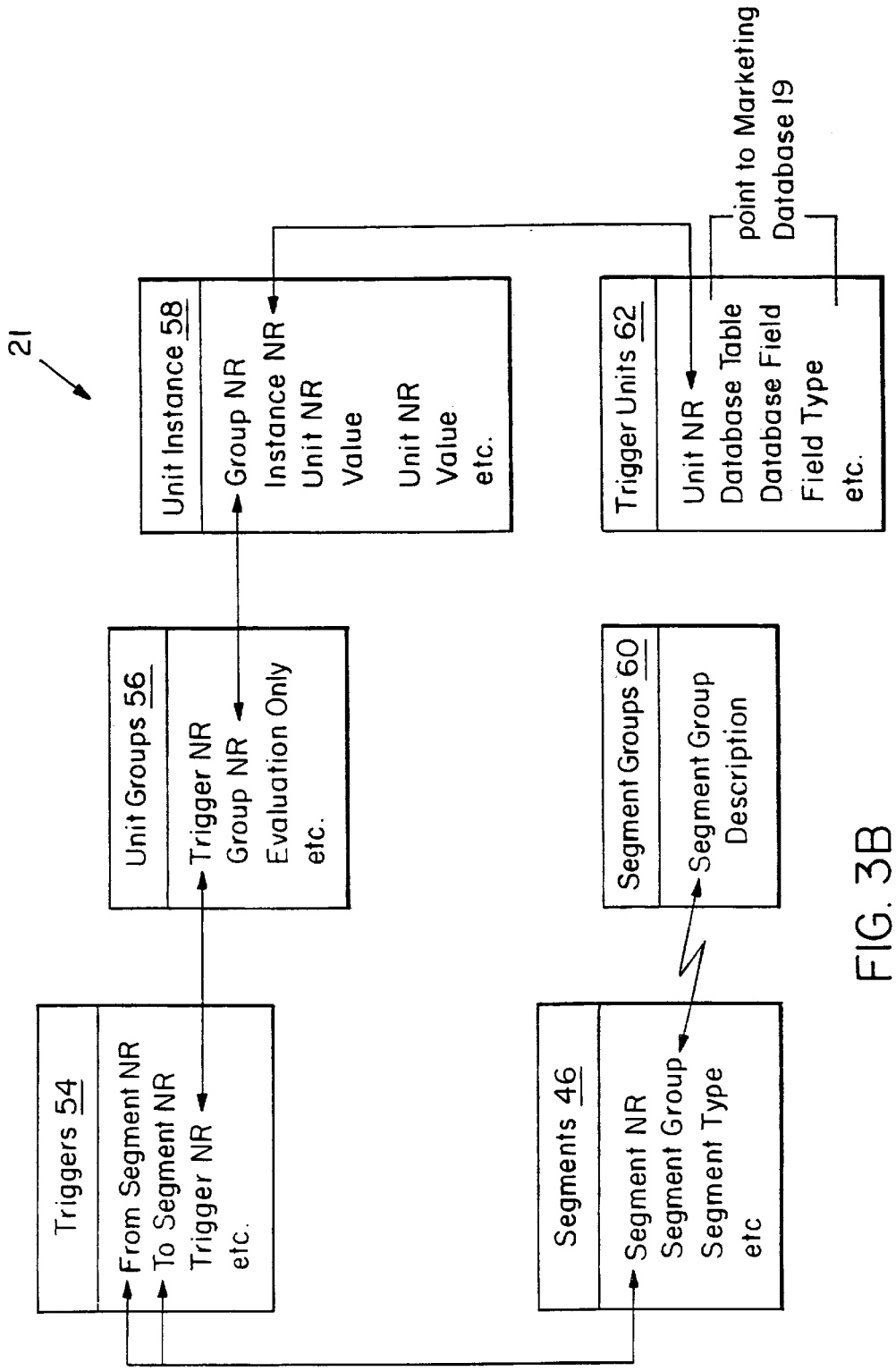

Referring to FIGS. 2, 3a and 3b, the marketing database 19 and strategy database 21 of the present invention are relational databases which follow a standard Structured Query Language (SQL). FIG. 2 illustrates the data structure for supporting the marketing database 19. Included in the marketing database 19 of a given merchant are a customer master table 20 and a program master table 22. The customer master table 20 holds a record for each customer of the merchant. In the record of a given customer, the customer is identified by a unique customer number ("Customer NR"). The record also indicates a current and prior grouping of the customer by a segment number ("Segment NR"), a prior segment number ("Prior Segment NR") and corresponding dates ("Date in Segment" and "Date in Last Segment"). The record also reflects the date of the last communication with the customer and the date the customer was originally added to the merchant's customer list. Other fields of the record include (a) contact data (address, phone/fax numbers, E-mail address, etc.), (b) demographic data (e.g., age, gender, marital status, etc.), and (c) general shopping activity, (e.g., "last purchase date" and "purchase frequency") among others depending on the type of business of the merchant.

Cross referenced by customer number are records in a Transaction History Subtable 24, Communication History Subtable 26 and Event History Subtable 28 of the marketing database 19. The records of the Transaction History Subtable 24 indicate the various purchases or transactions specific to each of the merchant's customers. Different shopping transactions by the same (or different) customers are recorded in different respective records. Effectively, this Subtable 24 records and stores the shopping history of the customer including seasonal purchasing, cumulative purchasing behavior and historic behavior.

To that end, each record of Subtable 24 and is headed by a customer number of a respective customer and contains details of one specific shopping transaction. Included are details such as order date, dollar amount and the like depending on the type of business (e.g., bank, insurance company, appliance retailer, etc.) run by the merchant. Also a working program 53 is referenced by Program Number ("Program NR") for the respective transaction. This provides an indication of the communication which prompted the customer to place the respective order (or otherwise initiate the subject transaction).

The Communication History Subtable 26 is formed of records indicating the specific communications which have been made to customers of the merchant. Each record is headed by a customer number of a respective customer and contains an indication (i.e., program number and date) of a communication made to that customer. Different communications to the same (or different) customer are recorded in different records.

The Event History Subtable 28 is formed of records indicating the various so-called events 37 (described below in FIGS. 4a and 4f) with which a customer has been involved. That is, each record identifies (i) a customer by customer number, and (ii) an event 37c by event number ("Event NR"). The event number serves as a cross reference to a record in the strategy database 21 where the event is predefined by the merchant.

The Program Master Table 22 lists executed working programs 53 of a merchant, one working program per record of the table 22. Specifically each record identifies an executed working program 53 by a unique program number ("Program NR"). The record also indicates an execution date and other program details such as communication channel used, destination code of the destination (e.g., mail house, telemarketer, etc.) where the corresponding communication was sent, and codes indicating the communication contents used, etc. It is these program numbers that are cross referenced in the records of the Transaction History Subtable 24 and Communication History Subtable 26.

FIGS. 3a–3b illustrate the data structure of the strategy database 21 as implemented in the preferred embodiment. Referring to FIG. 3a, a Program Table 32 provides one record for each working program 53 desired by a merchant. Each record identifies the respective working program 53 by a unique program number ("Program NR") and lists working codes for the program. Also the record indicates the channel 61 to be used for transmitting program contents. The program number is a cross reference link to four subtables in the strategy database 21: Program Items 38, Event Instance 34, Program Filter Segments 42 and Scheduling 44.

Each record in the Program Items Subtable 38 specifies the contents (program items 63 and attachments 65) of a subject working program 53 corresponding to the program number of the record. This is preferably accomplished by component codes and attachment codes/identifiers. The record also lists cost among other features/details of the program items 63 and attachments 65 for reporting purposes.

The Scheduling Subtable 44 provides one record for each working program 53. For a given working program 53 (indicated by program number), the respective scheduling Subtable 44 record indicates a date for initiating the program 53 and hence corresponding communication. Alternatively, the record indicates a recurring program 53/communication schedule. In the preferred embodiment, a "Recurring Flag" is stored in the record. Depending on whether the Flag is set (value=1) or not (value=0), the working program 53 is initiated on a recurring basis at the indicated frequency or initiated for a one-time communication at the specified schedule date, respectively.

The Event Instance Subtable 34 and Event Subtable 36 support implementation of events 37 in the invention system. Each record in the Event Instance Subtable 34 links an event 37 to a working program 53. That is, each record specifies a program number (corresponding to a desired working program 53) and name/value pairs corresponding to event criteria. The record is also headed with a unique event number (Event NR) and indicates event type (discrete or threshold).

The event criteria name ("Name") specified in a record of the Event Instance Subtable 34 references a corresponding record in the Event Subtable 36. That is, the Event Subtable 36 holds a different record for each different event criteria, arranged by name ("Name"). In a given record of the Event Subtable 36, there are three pointers (DBField, DBType and DBFieldmark) to pertinent fields in the Customer Master Table 20 of the marketing database 19. These pertinent fields hold customer data, which are to be measured against the value ("Value" field) specified in the record of the Event Instance Subtable 34, that references the subject record in the Event Subtable 36.

The Program Filter Segments Subtable 42 links a working program 53 (by program number) to target recipients, i.e., segments 39, (by segment number) and program filters 57 (by filter number). For each trio of working program 53, program filter 57 and segment 39, there is a different record in subtable 42. The filter number ("Filter NR") references a record in the Filters Subtable 48. The segment number ("Segment NR") references a record in the Segments Subtable 46 discussed below in FIG. 3b.

Each record in the Filters Subtable 48 is headed by a unique filter number ("Filter NR") and corresponds to a particular program filter 57. The record specifies a filter group which is a cross reference into the Filter Groups Subtable 50. For each filter group, there is a respective record in the Filter Group Subtable 50.

The main purpose of each record in the Filter Groups Subtable 50 is to specify filter criteria. This is accomplished by indicating pairs of filter component and corresponding desired value. Each filter component is identified by a respective component number ("Component NR"). The component number references a corresponding record in the Filter Components Subtable 52. The corresponding record provides pointers (Database Table, Database Field, Field Type) to pertinent customer data in the marketing database 19. The customer data is measured against the value specified in the record of the Filter Groups Subtable 50 which references the corresponding record in the Filter Components Subtable 52.

Referring to FIG. 3b, Segments Table 46 describes the various segments 39 of a merchant employing the present invention system. For each segment 39 there is a different record configured as follows. Each record is headed with a unique segment number ("Segment NR") to uniquely identify the corresponding segment 39. Following the segment number are indications of segment group and segment type. The segment group is a reference to a corresponding record in the Segment Groups Subtable 60. That record holds a description of the corresponding segment group. To that end, different records in the Segment Groups Subtable 60 describe different segment groups. This description is not in terms of specific customers belonging to the subject segment. The specific customers which belong to a subject segment 39 are indicated by segment number, in the "Segment NR" field, of the records in the customer master table 20, of the marketing database 19 (FIG. 2).

The implementation of triggers 49 is supported by Triggers Table 54, Unit Groups Subtable 56, Unit Instance Subtable 58 and Trigger Units Subtable 62 illustrated in FIG. 3b. Each record in the Triggers Table 54 links segments 39 to a trigger 49. In particular, a source or starting segment 39 is specified by segment number in the field "From Segment NR". A destination or resulting segment 39 is specified by segment number in the "To Segment NR" field. The subject trigger 49 is indicated by trigger number in the "Trigger NR" field. The trigger number is a reference to a record in the Unit Groups 56 Subtable.

The Unit Groups Subtable 56 provides a record for each trigger 49 predefined by a merchant employing the present invention system. Each record is headed by a trigger number ("Trigger NR") to uniquely identify the respective trigger 49. Following the trigger number is an indication of a corresponding group number ("Group NR") and an evaluation field. The group number crossreferences the Unit Group Subtable 56 record to a record in the Unit Instance Subtable 58.

The main purpose of the Unit Instance Subtable 58 is to indicate the combinations of various trigger units 51 to form triggers 49. That is, each record in the Unit Instance Subtable 58 corresponds to the formation of a particular trigger 49. The record is headed by a group number ("Group NR"), followed by an instance number ("Instance NR"). Following the instance number is an indication of the trigger units 51 used to form the subject trigger 49. In particular, each trigger unit 51 is identified by a unit number ("Unit NR") and an associated value.

Each unit number references a record in the Trigger Units Subtable 62. The referenced record holds pointers (Database Table, Database Field, and Field Type) to pertinent customer data in the marketing database 19. The customer data is measured against the value specified in the record, of the Unit Instance Subtable 58, which references the subject record in the Trigger Units Subtable 62.

Figure 4A:
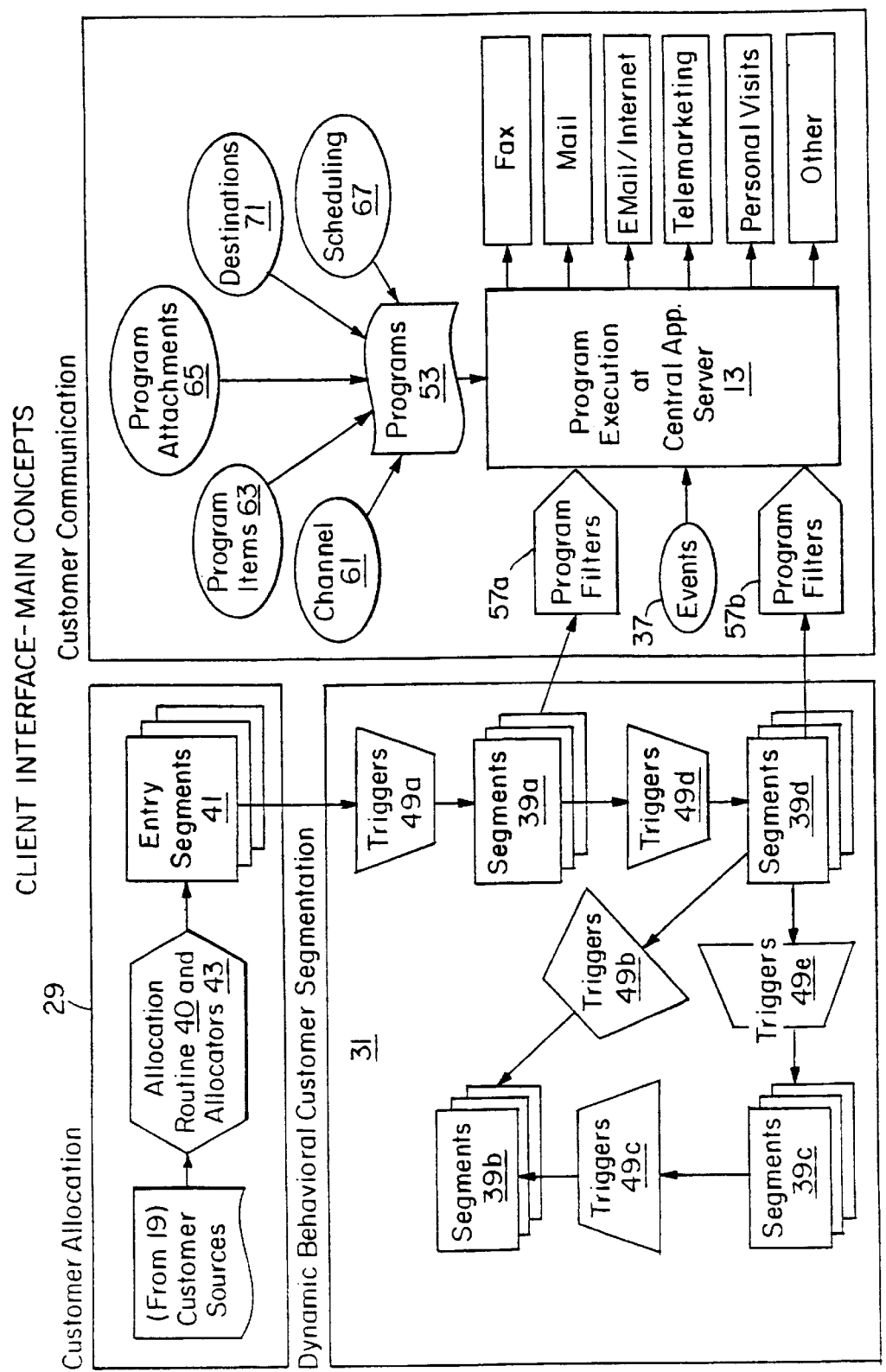
FIGS. 4a–4f are schematic diagrams of the working interface of the system of FIG. 1.

Interaction between a merchant and his respective strategy database 21 and marketing database 19 is implemented by a working interface 29 (FIG. 4a). The working interface 29 is operated/run on the merchant computer system 25 and involves graphical icons and various windows for prompting merchant input of information. In the preferred embodiment, the window layouts and icons are written in Visual Basic utilizing a standard Microsoft Windows '95 or Windows NT graphics interface. Other similar graphics programs and/or techniques are suitable.

In particular, four main screen views are displayed by the working interface 29. Briefly, a first main screen view enables merchant specification of initial grouping or segmentation of customers. A second main screen view enables merchant specification of criteria (i.e., triggers 49) for regrouping or resegmenting customers. A third main screen view enables merchant specification of desired working programs 53, events 37 and links between events 37 and programs 53. A fourth main screen view enables merchant specification of report templates for desired reporting of system activity. Further details of each main screen view are discussed with respect to FIGS. 4a–4f.

In the first main screen view, the interface 29 prompts the merchant to assign a new customer to an initial grouping or entry segment 41 as illustrated in FIG. 4a. This is accomplished through an allocation routine 40 (FIG. 4b) which places newly entered customers into various pools (called "entry segments" 41), based on present differences or expected differences in future shopping behavior, as stored and indicated in the merchant's marketing database 19. The allocation routine 40 employs merchant defined allocators 43 which are compound links that route a newly entered customer to an appropriate entry segment 41.

Figure 4B:
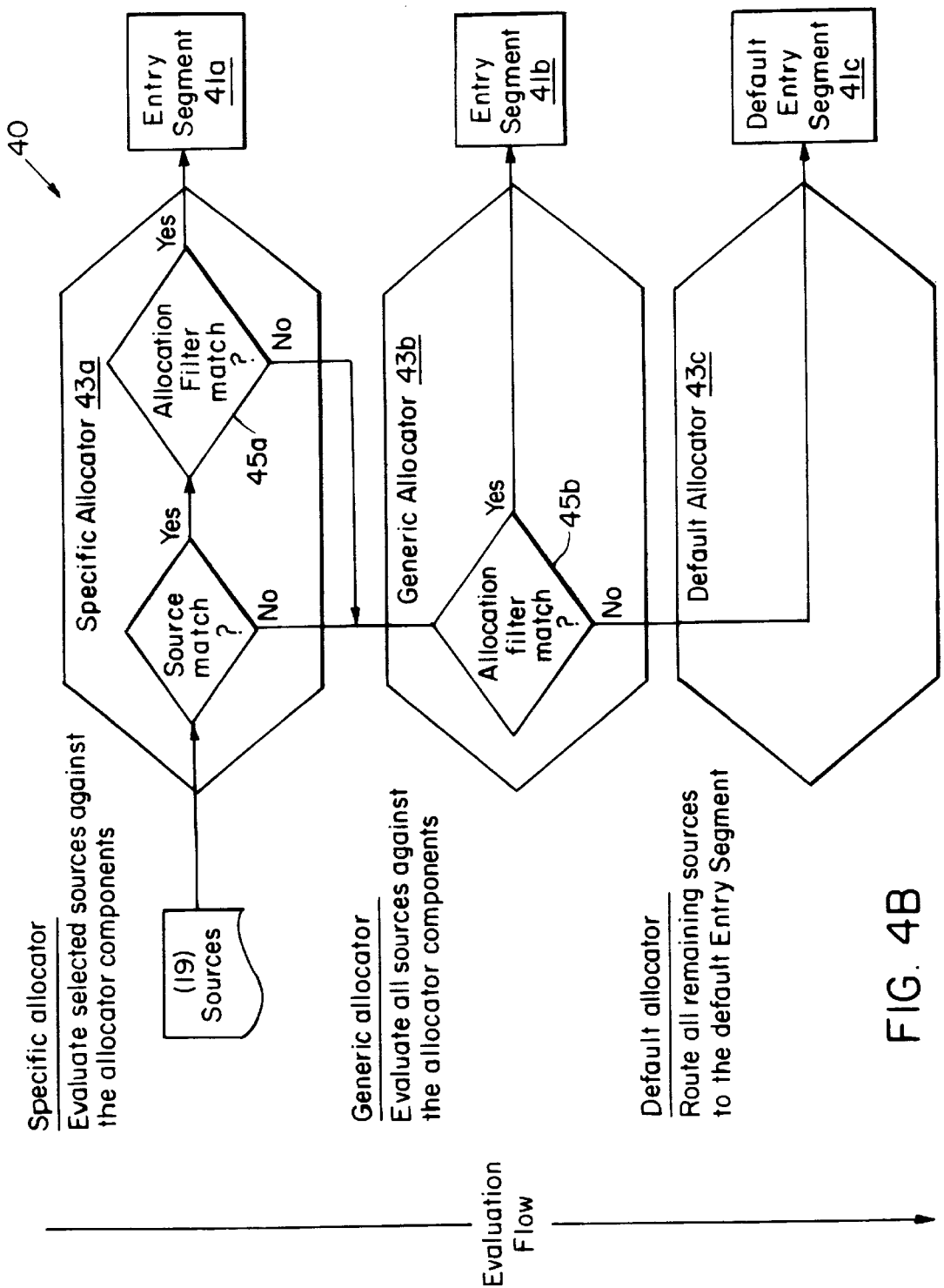

Preferably, there are three types of allocators: specific 43a, generic 43b and a default allocator 43c as illustrated in FIG. 4b. The specific allocator 43a evaluates the information of merchant specified customers against a merchant-defined allocation filter 45a. The allocation filter 45a routes the merchant-desired customers to a respective entry segment 41a. The generic allocator 43b evaluates information of all merchant customers against another allocation filter 45b, to route customers to another respective entry segment 41b. The default allocator 43c routes all remaining customers of the merchant to the default entry segment 41c.

Figure 4C:
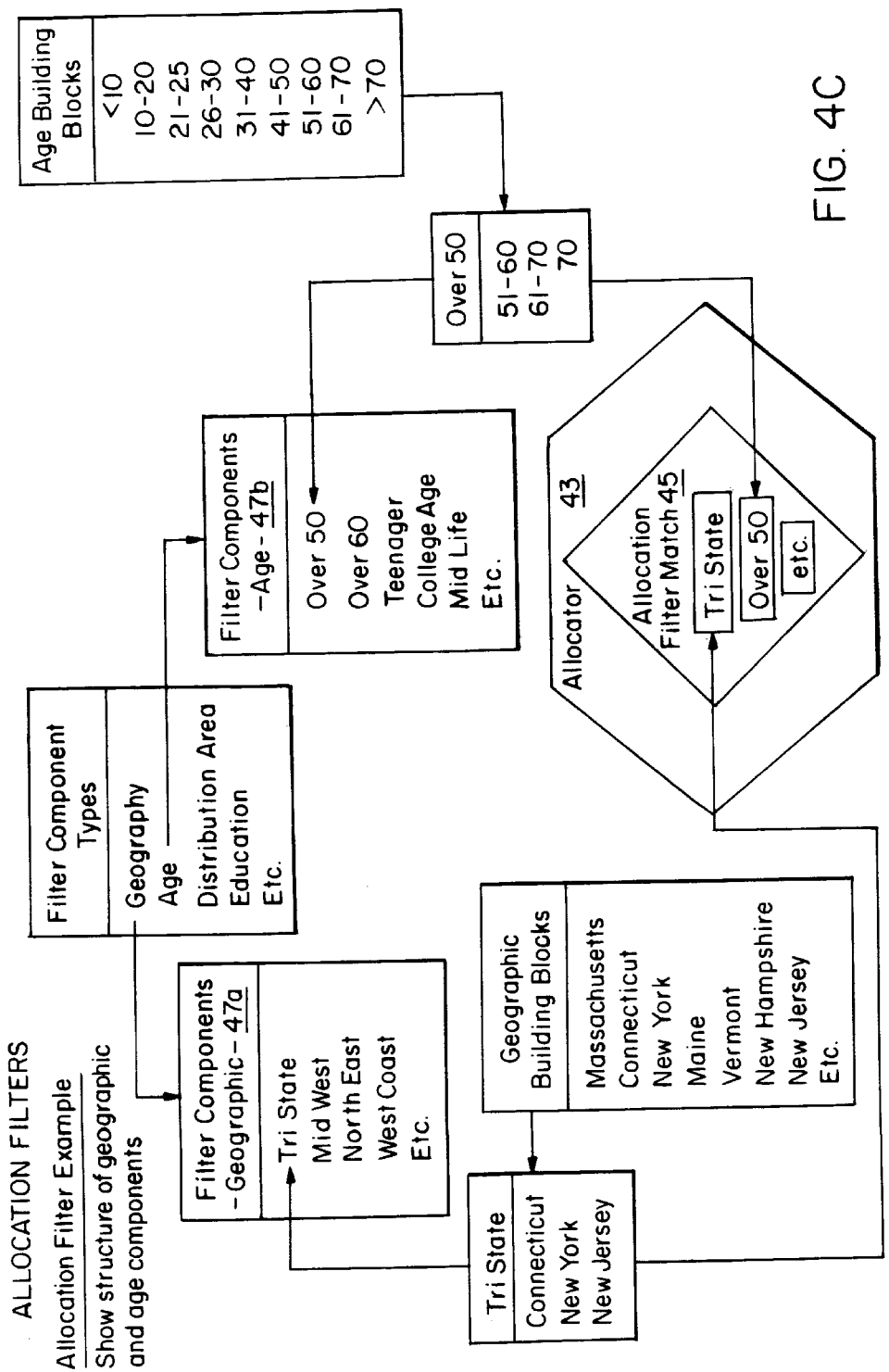

Preferably, each allocator 43 is a combination of discriminating components which effectively forms an allocation filter 45. As illustrated in FIG. 4c, allocation filters 45 are merchant-defined discriminators which can be based on any known information of a new customer. That is, the allocation filters 45 are formed from any data such as geographical (state, city, zip), age, gender, educational background, etc. The allocation filters 45 may also be built from derived data, such as a demographic cluster index based on postal zip code. The only requirement is that the information on which the allocation filter 45 is based is either known (e.g., address data) or can be directly derived from data that are initially known of a new customer.

To define an allocation filter 45 in the interface 29, the merchant specifies various desired filter components 47 (i.e., criteria to serve as filtering factors). These filter components 47 are then combined and attached to an allocator 43 to build a sophisticated discriminator. FIG. 4c illustrates a geographic filter component 47a, and an age filter component 47b which are combined to form an allocation filter 45 in a merchant-desired allocator 43.

Initially the interface 29 displays a listing ("Filter Component Types") of the various categories of information or criteria which may be used as filter components 47. The merchant selects desired filter component categories from this listing (for example, "geography" and "age"). Within the geographic filter component 47a, the merchant is able to define various geographic regions such as a tri-state region covering Connecticut, New York and New Jersey, in the instant example. The interface 29 provides a "Geographic Building Block" which lists the various fifty U.S. states, etc., from which the merchant defines the tri-state region.

In the sample age filter component 47b of FIG. 4c, the interface 29 enables the merchant to define various age categories. The illustrated "over 50" age category is merchant specified to cover ages 51–60. The "Age Building Block" of the working interface 29 assists the merchant in defining the "over 50" age category.

After being defined by the merchant, each filter component 47 is ANDed together or otherwise combined in an allocation filter 45. The combination of filter components 47 then serves as the criteria by which the filter 45 separates or discriminates incoming customer information. Thus, the sample allocation filter 45 illustrated in FIG. 4c routes customers over the age of 50, living in Connecticut, New York or New Jersey, etc., to their own entry segment 41.

For each of the allocators 43 (specific and generic in FIG. 4b) the merchant defines a respective allocation filter 45 using the interface 29, as explained above in FIG. 4c. As such, the merchant defines different entry segments 41 for different desired initial groupings or segmentation of his customers.

Accordingly, upon merchant input of information of a new customer into marketing database 19, the central digital processing assembly 11 (FIG. 1) applies/executes allocators 43. In turn, the new customers are assigned to an initial grouping/entry segment 41 dictated by allocators 43 in allocation routine 40. Indications of entry segments 41 are stored (as segment numbers) in the customer master table 20 of the marketing database 19.

Referring back to FIG. 4a, segmentation in the present invention is performed based on a combination of static data (demographics, psychographics, etc.) and dynamic data (behavior) as provided by the merchant and stored in the marketing database 19. Further, initial (or entry) segmentation is achieved through the allocation routine 40 (allocators 43), but subsequent segmentation (or resegmentation) is performed on an ongoing basis by a dynamic behavioral segmentation routine 31 (FIG. 4a). The strength of the invention segmentation process/ routine 31 is in its dynamic nature. That is, when a customer's behavior develops or changes, he or she is automatically resegmented by segmentation routine 31 based on the predefined criteria called "triggers" 49.

Figure 4D:
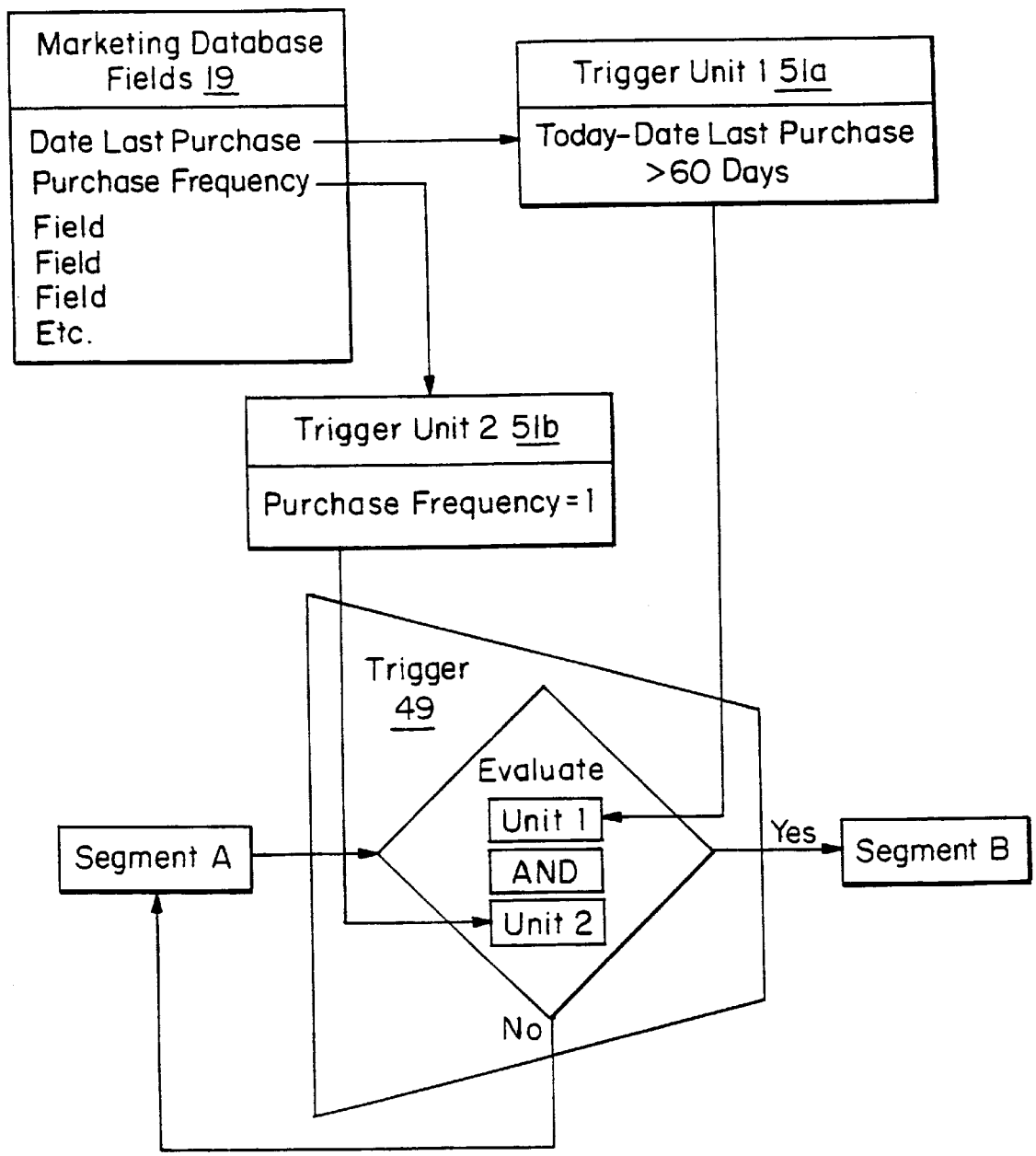

As previously mentioned and illustrated in FIG. 4d, triggers 49 are formed of combinations of predefined evaluation units called trigger units 51. Each trigger unit 51 is based on any information that can be captured from the marketing database 19 of the merchant. The combination of trigger units 51 into triggers 49 enables the creation of powerful segmentation criteria by the merchant.

Using the second main screen view of interface 29, the merchant defines desired trigger units 51 by specifying a determining threshold or value for certain fields of information from the marketing database 19. Preferably, the merchant employs a Boolean type expression to delimit the desired criteria for the trigger unit 51. For example, in FIG. 4d the merchant specifies a minimum threshold of 60 days for the "last purchase date" field of marketing database 19, by the expression "Today–Date Last Purchase>60 days". The merchant uses this expression to define a first trigger unit 51a. To define a second trigger unit 51b, the merchant, using the interface 29, specifies a certain desired value for the "purchase frequency" field of the marketing database 19 (e.g., "Purchase Frequency=1").

Next, using the interface 29, the merchant combines the defined trigger units 51a and 51b using AND, OR, NOT or NOR to express a desired total criteria of a trigger 49. In the illustration of FIG. 4d, the example first and second trigger units 51a, 51b are AND'd together to form trigger 49. In turn, trigger 49 by design implements the following segmentation criterium: separate all customers who have made only one single purchase where the purchase date was more than two months ago. The resulting segment (i.e., grouping of a subset of customers of a merchant) may be used to satisfy a marketing goal of reactivation of old "single" buyers through an especially designed communication campaign by the merchant.

Other triggers 49 are similarly formed/defined by the merchant using the foregoing described steps of FIG. 4d. With each trigger 49, a merchant designs a desired respective segment 39 of customers which are to be similarly treated, i.e., receive the same communications.

Each trigger 49 is employed by the central digital processing assembly 11 (FIG. 1), i.e., executing segmentation routine 31, to continually monitor customer behavior as recorded in the marketing database 19, and to separate corresponding customers when the trigger unit conditions apply. To that end, the system of the present invention provides dynamic segmentation, and in particular, dynamic behavioral segmentation as illustrated at 31 in FIG. 4a. As such, while the merchant provides for input to marketing database 19, more and more information regarding customers and new customer information, the central digital processing assembly 11 employs the triggers 49 to resegment the initial groupings/entry segments 41 and other segments 39, of customers of the merchant, to resulting segments 39. This continually and automatically occurs with the support of the customer data stored in marketing database 19 of the merchant. As a result, various segments 39a, b, c, d are formed of the merchant's customers, and are recorded in the "Segment NR" field of each customer in the Customer Master Table 20 (FIG. 2) of the marketing database 19.

In addition to triggers 49, merchant defined events 37 provide dynamic behavioral segmentation. Through the third main screen view of interface 29, a merchant defines an event 37 in a working program 53 of the respective strategy database 21. As illustrated in FIG. 4f there are two types of events: discrete events 37a and threshold events 37b. A discrete event 37a is, for example, the purchase of a specific product as recorded in the marketing database 19. A threshold event 37b is determined from the tracking of a specified behavior up to a merchant-defined threshold. For example, a customer who makes his or her tenth purchase is a threshold event as can be determined through the shopping activity recorded in the marketing database 19. The merchant uses Boolean type statements, similar to those used in triggers 49, to specify desired events 37. The statements may employ any factors/criteria obtainable from the marketing database 19, similar to that discussed above for triggers 49 and trigger units 51.

Once an event 37 is defined, the central digital processing assembly 11 monitors the transaction stream/shopping activity as recorded in the marketing database 19 and evaluates all necessary data relating to the event 37. As soon as a customer's actions satisfy the event definition, he or she is marked to be targeted by the program 53 using this specific event 37. That is, such customers are extracted and grouped together at 69 (FIG. 4f) for subsequent program 53 execution. Specific execution of the program 53 is then distributed to application servers 13 as detailed below. Thus, the implementation of the event extraction feature allows for refinement of customer targeting which makes it possible to communicate with a single customer based on a specific behavior.

Figure 4E:
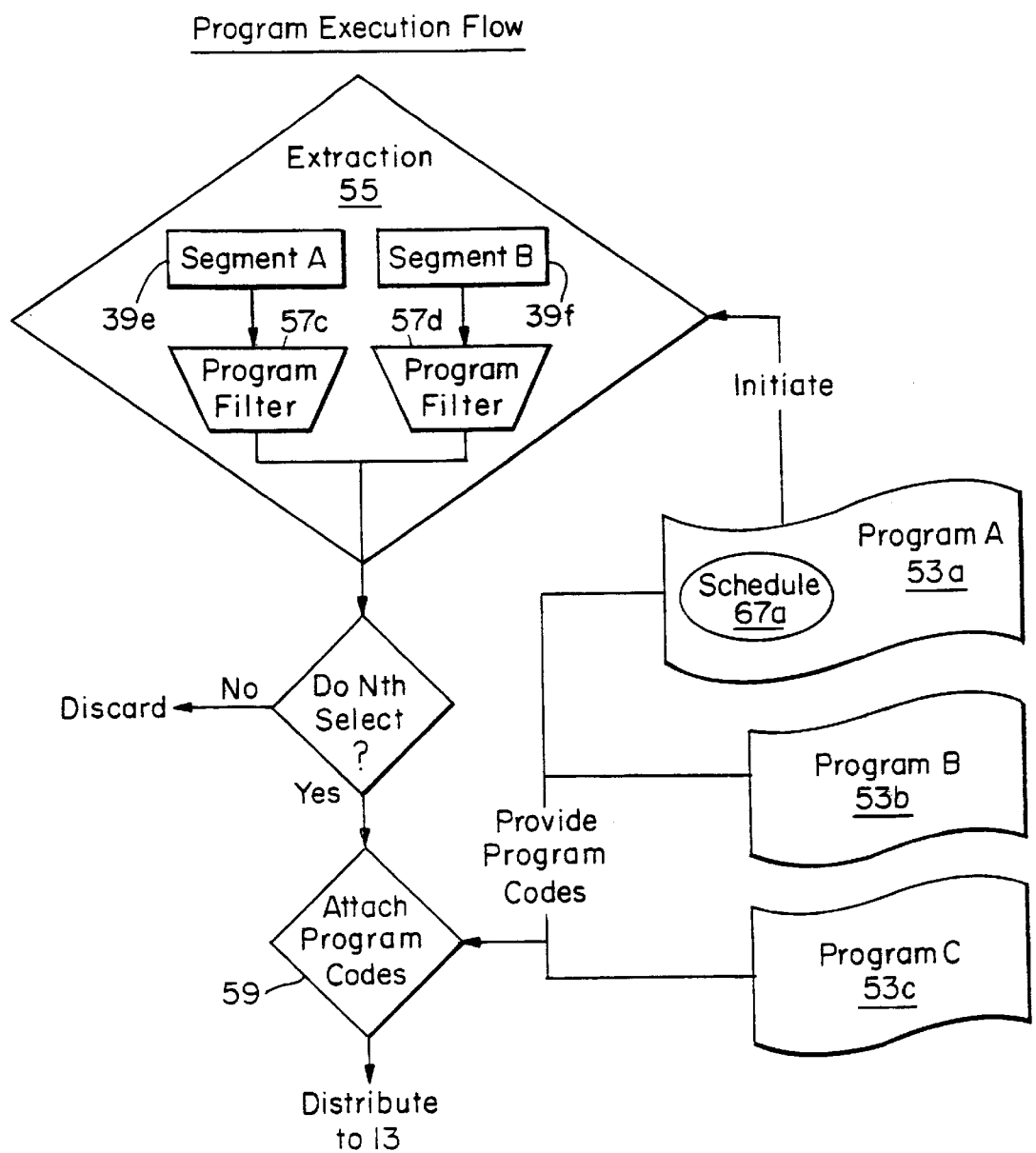
Figure 4F:
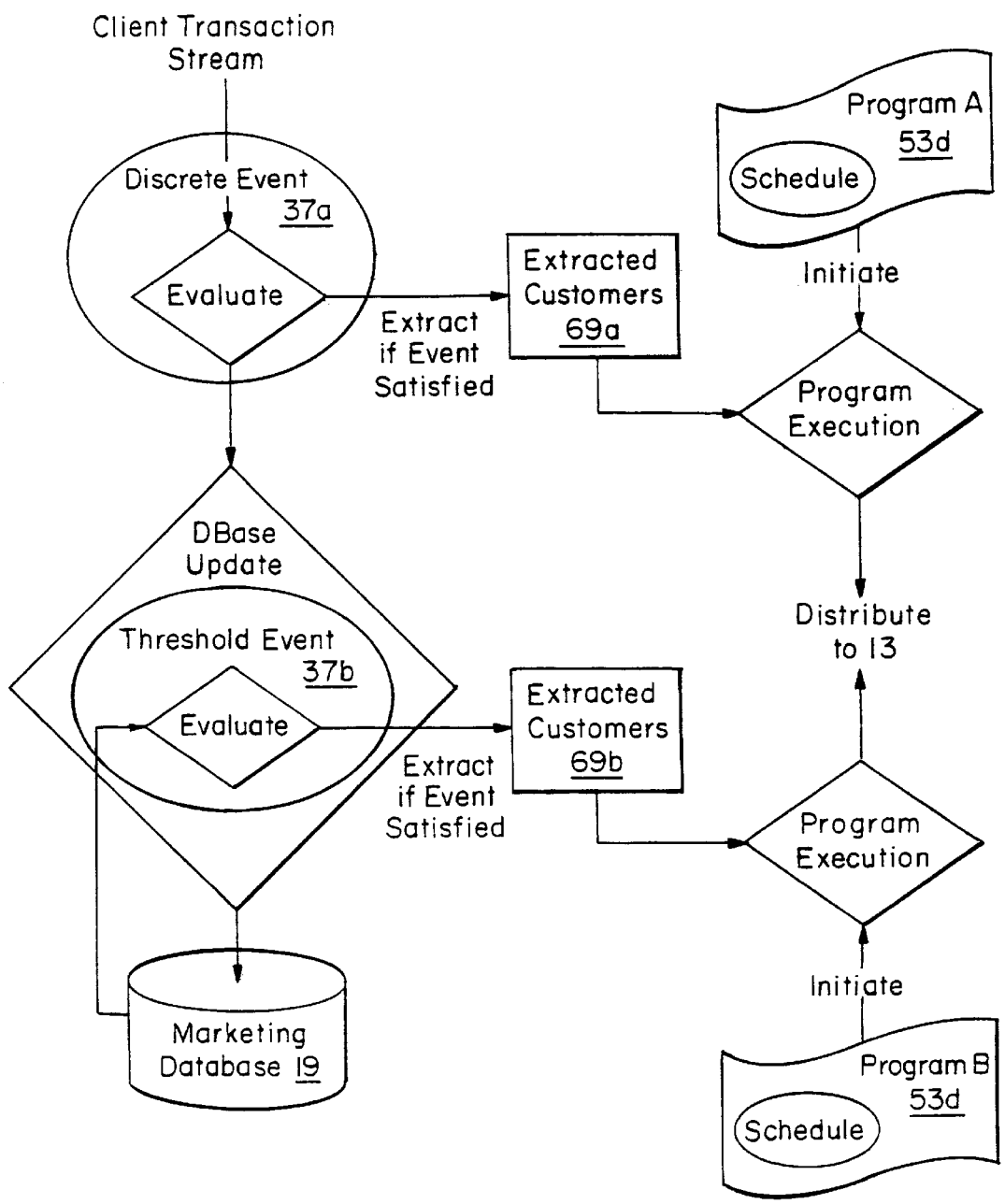
Figure 6:
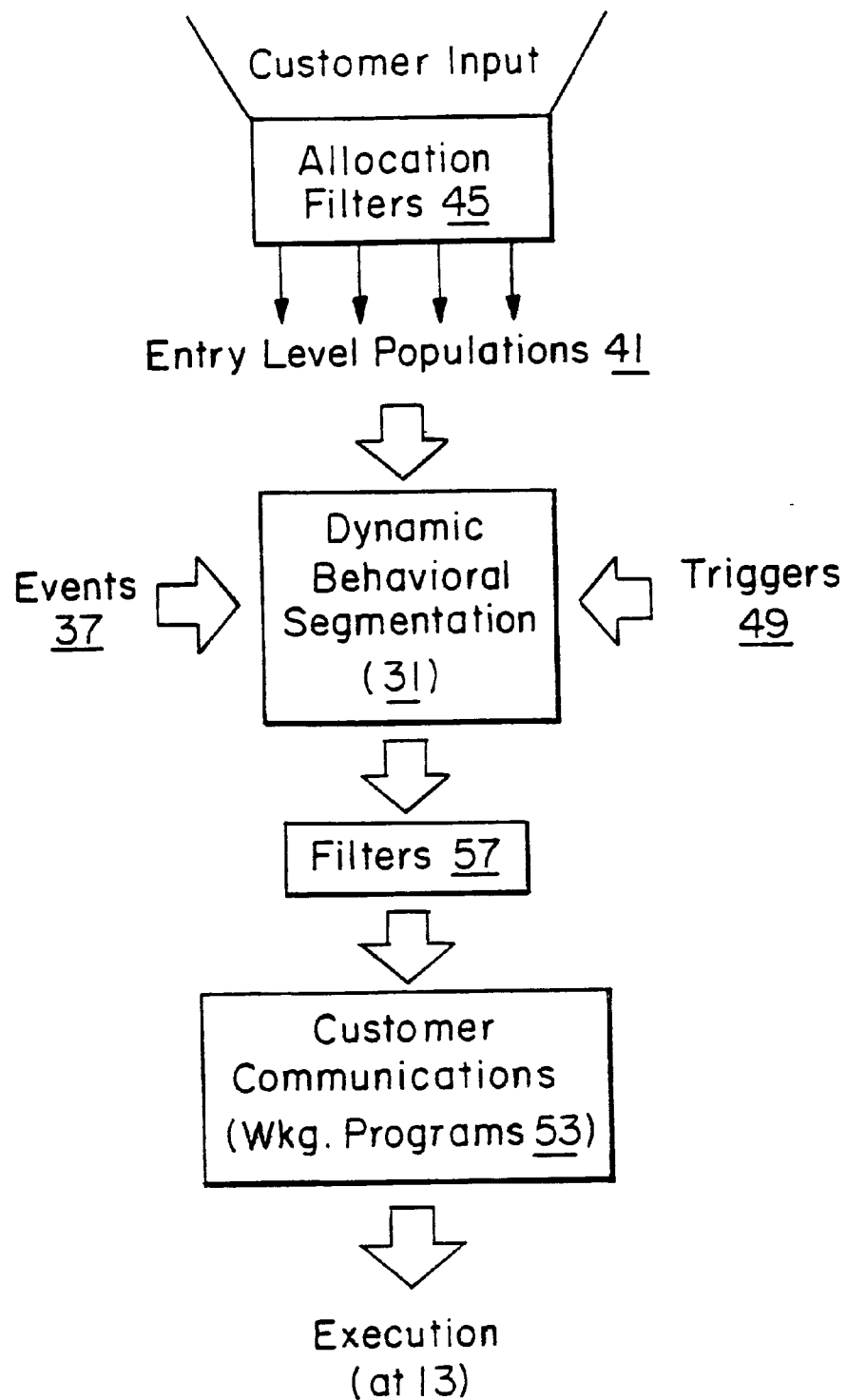
FIG. 6 is a block diagram of system program flow of the system of FIG. 1.

As illustrated in FIGS. 4a, 4e and 6 discussed next, simultaneously with the dynamic behavioral segmentation routine 31 based on triggers 49 and/or events 37, the central digital processing assembly 11 executes the working program/plan outlines 53 for customer communication defined by the merchant in the strategy database 21. That is, once working programs 53 are defined, the central digital processing assembly 11 (1) schedules their execution accordingly (i.e., based on specified schedule 67), and (2) automatically executes them at the application server 13 (FIG. 1) of the merchant. As will become apparent, the combination of allocators 43, allocation filters 45, triggers 49, program filters 57, events 37 and working programs 53 provides a merchant everything needed to communicate (as automated through the present invention system) the right message, to the right customer, at the right time.

Briefly, referring to FIG. 6, a merchant provides customer data. Allocation filters 45 predefined by the merchant assign customers to initial groupings or entry level segments 41. The central digital processing assembly 11 continually monitors customer shopping behavior as recorded in marketing databases 19. Based on merchant defined triggers 49 and events 37, the processing assembly 11 reassigns customer groupings or dynamically resegments a merchant's customers based on recorded customer behavior. Resulting final segments/groups of customers are further filtered by program filters 57 to refine targeted recipient groups of a particular communication defined in a respective working program 53. That working program 53 is then executed with the resulting filtered customer recipient group. Restated, working programs 53 are executed against a group of recipients who are either extracted from selected dynamically formed segments 39 or separated based on the predefined conditions of merchant specified events 37. Program filters 51 further refine the group of target recipients or alternatively may sift through the whole customer base (i.e., marketing database 19) of a merchant for a desired communication/working program 53.

Program filters 57 are similar to allocation filters 45 (FIG. 4c) and may be formed of the same components 47. That is, they may be built from any data such as geographical, age, gender, educational background, derived data such as demographic cluster index based on zip code, etc., as known or directly derived by the merchant based on knowledge about the customer. Program filters 57, however, are used to extract subsets of customer groupings from segments 39 when desired. Because most segments 39 will harbor more information about a customer than what was known at the initial contact, program filter 57 components cover a broader range than allocation filter components 47. For example, proven information about seasonal purchase behavior or product preferences (which are developed based on actual behavior) may be built into a program filter 57 but not into an allocation filter 45 since it is not known at the time the merchant creates the allocation filter 45.

As shown in FIG. 4e, a working program 53a may be assigned to one or more segments 39e, 39f (as initially defined by the merchant in the strategy database 21) but when the central digital processing assembly 11 schedules and activates the program 53, all customers in those segments 39e, 39f will be extracted as targets for the program 53a. This extraction 55 may be subsequently narrowed by using the merchant-defined program filters 57c, 57d, respectively. This allows for greater flexibility in targeting groups of customers through the combination of segmentation and filtering. After the extraction/filtering in 55, the digital processing assembly 11 attaches program codes 59 as specified in the working program 53 parts 61, 63, 65, 71, and distributes the program 53 for execution at an application server 13.

In the case where program execution is initiated by an event 37, the central digital processing assembly 11 schedules the working program 53 to be executed against one or more customers, who have been extracted from the marketing database 19 of the merchant, as a result of an event 37 (predefined by the merchant) as illustrated in FIG. 4f. The extracted group of target customers may likewise be filtered by a program filter 57 as illustrated in FIG. 6. After the program filtering 57, the digital processing assembly 11 attaches program codes as specified in the working program 53 parts and distributes the program 53 for execution at an appropriate application server 13.

Figure 5:
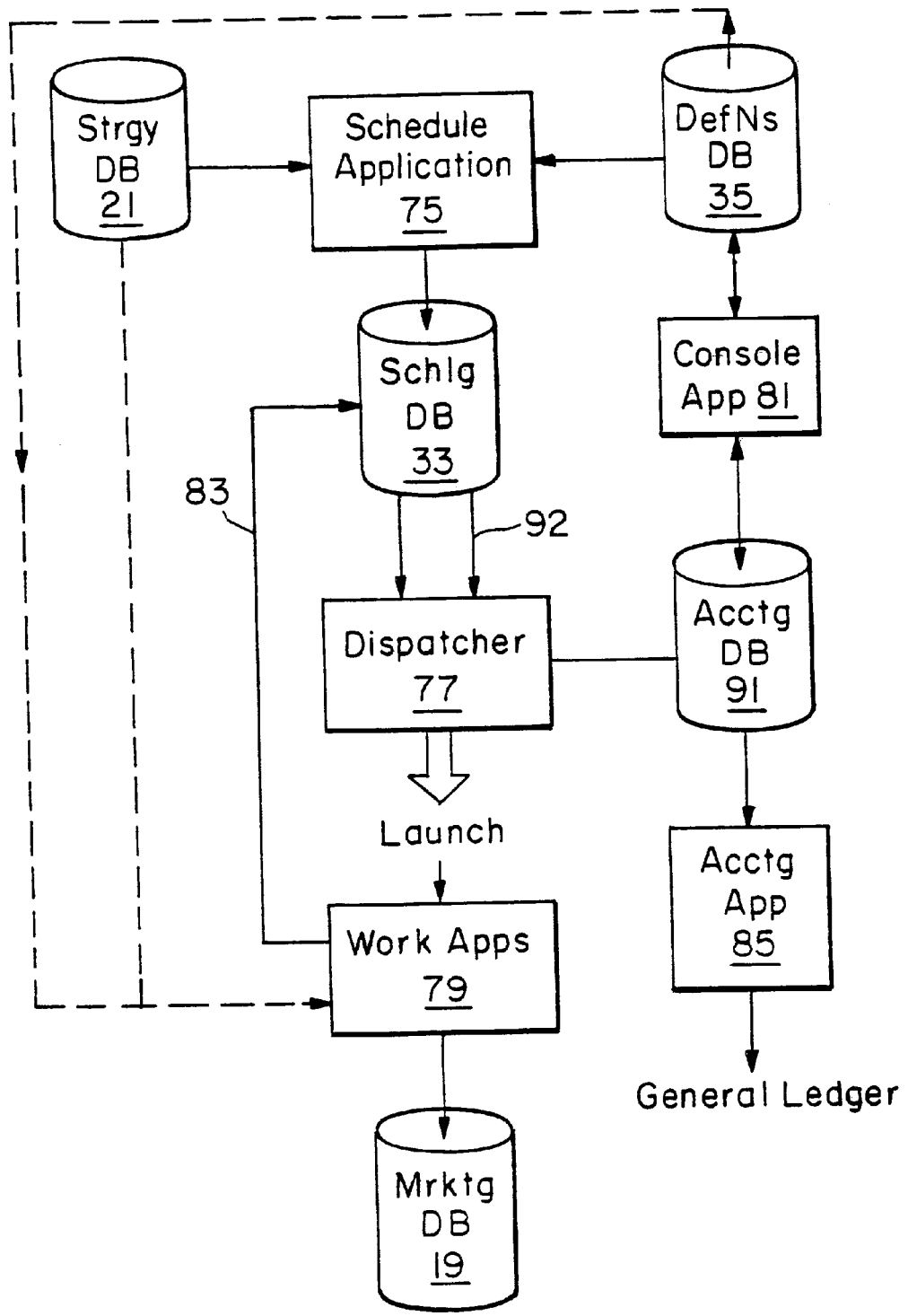
FIG. 5 is a work flow diagram showing flow of control and data in the system of FIG. 1.

Referring to FIGS. 1 and 5, the system of the present invention is monitoring numerous merchant marketing and strategy databases 19, 21 and executing various working programs 53 for plural merchants simultaneously. To support this variety of merchant data across the different merchants, the definitions database 35 holds information unique to a merchant. For example, for each merchant, the definitions database 35 specifies how often the merchant provides updates to customer information in marketing database 19. In turn, this designates the frequency with which processing assembly 11 is to perform segmentation routine 31. The definitions database 35 also stores the specific calculations for segmenting based on merchant defined triggers 40. Information regarding location of marketing and strategy databases 19, 21 of a merchant is also recorded in definitions database 35. In addition, the definitions database 35 indicates custom fields in the marketing and strategy databases 19, 21 of each merchant and parameters and calculations for updating the same.

In order to synchronize, schedule and consolidate the various jobs of the system, the communication server 15 receives the working program 53 information from the strategy databases 21 of the merchants. In turn, the communications server 15 schedules and consolidates the various working programs 53 in a scheduling database 33. In the preferred embodiment, this is accomplished by a scheduling application 75 executed by the communications server 15 as illustrated in FIG. 5. The scheduling application 75 determines priority of working programs 53 with respect to timing at which to begin execution based on scheduling data 67 specified by the merchant in the strategy database 21 and merchant specific definitions stored in definitions database 35. As a result, the scheduling database 33 holds a sequence of the various jobs of the network of the present invention system.

The main server 17 executes a dispatcher subprogram 77 which looks at the jobs in the scheduling database 33 and dispatches them to various working applications 79 on the applications servers 13 according to program 53 details. A console application 81 (FIG. 5) of the main server 17 (FIG. 1) allows a program administrator to define the fields of the marketing databases 19 and supports the dispatcher subprogram 77 with necessary parameters as defined in the definitions database 35. In particular, the console application 81 maintains merchant customizations and stores such data in the definitions database 35. The definitions in database 35 specify which merchant input information/ data corresponds to which fields in the marketing database 19, and what calculations to make on data input by the merchant. The working applications 79 on application servers 13 then use these definitions as parameters for the various jobs dispatched to them from the main server 17.

In response to the dispatcher 77 launch, applications servers 13 do the actual execution of the working programs 53 and perform the dynamic segmentations (on marketing database 19) based on the merchant-defined triggers 49 and events 37 (stored in strategy database 21). The operation of the working applications 79 on applications servers 13 is supported by the respective strategy database 21 and definitions database 35 as illustrated by the dashed lines indicating flow of data in FIG. 5. Application server 13 execution of a working program 53 involves (a) compiling and preparing specified documents from form letters to attachments/brochures and electronic documents, and (b) transmitting the documents across designated communications channels (e.g., facsimile, mail, E-mail, on the Internet, Website, etc.) It may alternatively involve (a) ordering or otherwise indicating preprinted matter from a mail house, (b) trasmitting the order along with pertinent customer names and addresses to the mail house or telemarketer for their assembly and eventual output/mailing. Other alternatives are possible and understood to be within the purview of one skilled in the art.

In a preferred embodiment, Microsoft OLE techniques are employed to attach documents to a communication. Also the attachments may be in electronic form such that upon execution of a working program 53 for a determined set of customers, the form becomes completed with the customer information such as name, address and item purchased or whatever similar data is applicable. The application server 13 obtains this data from the marketing database 19 for completing the electronic form attachment.

In another embodiment, some documents are compiled for collating and printing on demand purposes. That is, a certain subset of pages from all possible pages is determined on an individual recipient basis. This enables a catalogue for example to be created "on-the-fly" (i.e., at print time). Desktop publishing or similar programs/routines are utilized to effect this output feature.

After execution of a working program 53, the working application 79 of an application server 13 stores output of the programs 53 at the scheduling database 33 as indicated by loop 83 in FIG. 5. The various providers or vendors such as telemarketers and mail houses then download their jobs (program 53 output, including location of customer names and documents) from the scheduling database 33 at 92 in FIG. 5. An internal accounting application 85 executed on main server 17 records any such program output transactions in accounting database 91. In turn, accounting application 85 and accounting database 91 support billing, and the like, of merchant-to-customer communications generated by the invention system.

In addition, merchants are able to make an accounting of the communications being made and the groupings of customers/recipients being made by the invention system. This is accomplished by a reporting database 23 (FIG. 1). Main server 17 and or communication server 15 maintains report database 23 with appropriate information from the other components of central processing assembly 11. Report database 23 is then copied or downloaded to respective merchant computer systems 25. Report databases 23 are preferably SQL configured or configured for coupling to a merchant's desired reporting software package. Alternatively, reporting may be made available on-line such as through the Internet. In this case, the merchant prespecifies one or more templates (or report formats) and a schedule for use by main server 17. Upon receipt of a report request from a merchant, or at a prescheduled time, main server 17 prepares a report according to the prespecified format and transmits the report to the calling site of the merchant. Other reporting methods are suitable.

While the invention has been particularly shown and described with reference to a preferred embodiment thereof, it will be understood by those skilled in the art that various changes in form and details may be made therein without departing from the spirit and scope of the invention as defined by the appended claims.

For example, application servers 13, communication server 15 and main server 17 may be implemented by one digital processor. In that case, consolidation, scheduling, initial and subsequent segmenting of customers and execution of working programs is accomplished through the one processor running the present invention software.

Neural networks may be employed for the triggers 49 to obtain segments 39 (FIG. 4a) of customers as desired by the merchant. The neural networks would operate on the contents of the marketing database 19 as input. From the ongoing additions to the marketing database (i.e., changes in customer's shopping behavior/activity), the neural networks learn each individual customer's shopping behavior and segment customers accordingly.

Further, instead of the neural networks implementing triggers 49, a multiple regression correlation based on the data in the marketing database 19 may be used for segmenting customers. Alternatively, rule based expert systems may be similarly employed in the present invention to provide dynamic behavioral segmentation.

In a further example, the invention communication system may be employed on the Internet. The merchant having an existing Website formats his Home Page with topic selections and links (e.g., Hypertext HTML technology) to appropriate working programs 53. In particular, for each topic selection there is a respective hyperlink to a working program 53 and optionally an event 37 for initiating the program 53. Upon end user selection of a topic from the merchant's Home Page, the present invention applies the linked event 37 (if any). If the criteria of the event 37 are met (or if there is no initiating event 37), then the present invention executes the corresponding working program 53. This results in the working program 53 contents 63, 65 being transmitted (on-line, through a vendor-mail house, telemarketer, or from the merchant himself as described previously) to the end user. The contents (program items 63 and attachments 65) include information corresponding to the topic selected by the end user, as predetermined by the merchant at the time the Home Page selections and links are defined. In order for event 37 conditions to be monitored or evaluated, the present invention maintains the marketing database 19 to include data regarding Web transactions of the end user.

To implement the foregoing, the present invention software (marketing database 19, strategy database 21 and processing assembly 11 routines) would reside on a working processor in the Internet, and the merchant's Website is linked through the working processor to his Internet provider. A router enables communication from the merchant's Website to the invention working processor. The working processor's URL (universal resource locator) is then employed in the merchant's Home Page to form the hyperlinks to (1) the marketing database 19, and (2) the working programs 53 residing in the invention software (in the working processor). JAVA Scripting (by Sun Microsystems, Inc.), and ACTIVEX are utilized to form the Home Page and various other Web pages of the merchant at his Website. Mircosoft ASAPI and CGI are employed to enable coupling between the database 19 and the present invention software by methods becoming common in the art.

In another embodiment, the present invention system (central digital processing assembly 11) is based at a main site of a company. Different branches, departments and/or sites of the company utilize the system from separate workstations 25 as though they are the separate (individual and different) merchants in the previous description of the preferred embodiment of FIG. 1. That is, instead of various merchants utilizing the system, various departments/divisions or employees of the same merchant-company (at a central or different sites) utilize the invention system, to automate communications in response to (ongoing) shopping behavior of its customers. Different departments use communications programs 53 of different purposes and different triggers 49/events 37. For example, the accounting department may define a trigger 49 to segment those customers with a good credit history and make a special offer for three months of interest-free purchases placed on the company credit card. The catalogue department may define a trigger 49 to segment customers who are seasonal shoppers who frequently shop by mail, and make a special seasonal mailing including compiling a catalogue of items for sale in the subject season, and so forth.

Also it is understood that various fields in the marketing and strategy databases 19, 21 depend on the type/area of business of the merchant. To that end, different fields are used in different merchant's databases 19, 21. The fields shown and discussed above in FIGS. 2 and 3a–3b are for purpose of illustration and not limitation of the present invention.

What is claimed is:

1. In a computer network, a communication system for providing a planned series of communications from merchants to customers comprising:

means for tracking and storing indications of customer identity and activity including (a) demographic data, (b) indications of time-driven actions and actions invoked by a customer and (c) communications by a customer to a merchant, said means for tracking and storing continually updating customer identity and activity indications;

a segmenter responsive to the tracking and storing means continually updating customer identity and activity indications, the segmenter forming working segments of merchant customers as a function of at least demographics, actions invoked by a customer and communications by a customer to a merchant; and a digital processor assembly coupled to the segmenter, as a function of working segment, the digital processor assembly executing a program of communications predefined for the working segment, by the digital processor assembly determining (a) dates for each of the communications in said program based on predefined times desired by the merchant and (b) contents of each of the communications in the program from predefined indications of merchant desired communications.

2. Apparatus as claimed in claim 1 wherein the means for tracking and storing include a first data base for storing identification, demographics and indications of actions invoked by customers and communication by customers.

3. Apparatus as claimed in claim 2 wherein the first database provides an ongoing activity and communication history of customers;

the segmenter monitors the first database and in response constantly regroups customers into different working segments to provide dynamic behavioral segmentation of customers; and the digital processor assembly executes multiple programs of communications for a working segment such that there are plural, different planned series of communications for customers of that working segment.

4. In a computer network, a method for providing a planned series of communications from merchants to customers, comprising the steps of:

tracking and storing indications of customer identity and activity including demographic data, time-driven actions, actions invoked by a customer and communications by a customer to a merchant, said customer identity and activity indications being continually updated by said tracking and storing;

grouping and regrouping customers in response to said tracking and storing continually updating the customer identity and activity indications, said grouping and regrouping forming working segments of merchant customers; and as a function of working segment, executing a program of communications predefined for the working segment by determining (a) dates for each of the communications in said program based on predefined times desired by the merchant and (b) contents of each of the communications in the program from predefined indications of merchant desired communications.

5. A method as claimed in claim 4 wherein the step of tracking and storing includes (a) providing a first data base for storing identification, demographics and indications of actions invoked by a customer and communications by a customer, and (b) periodically updating the first database to provide an ongoing activity and communication history of customers.

6. A method as claimed in claim 4 wherein the step of grouping and regrouping includes constantly regrouping customers into different working segments in a manner which provides dynamic behavioral segmentation of customers.

* * * * *